United States Patent
Petiziol

(10) Patent No.: US 11,647,866 B2
(45) Date of Patent: May 16, 2023

(54) GRINDER/DOSER DEVICE FOR COFFEE BEANS

(71) Applicant: MACAP S.R.L., Martellago (IT)

(72) Inventor: Marco Petiziol, Martellago (IT)

(73) Assignee: MACAP S.R.L., Martellago (VE)

( * ) Notice: Subject to any disclaimer, the term of this patent is extended or adjusted under 35 U.S.C. 154(b) by 0 days.

(21) Appl. No.: 17/668,794

(22) Filed: Feb. 10, 2022

(65) Prior Publication Data
US 2022/0257056 A1 Aug. 18, 2022

(30) Foreign Application Priority Data
Feb. 17, 2021 (IT) .................... 102021000003674

(51) Int. Cl.
  *A47J 42/16* (2006.01)
  *A47J 42/20* (2006.01)
  *A47J 42/46* (2006.01)
  *A47J 42/38* (2006.01)

(52) U.S. Cl.
  CPC .............. *A47J 42/16* (2013.01); *A47J 42/20* (2013.01); *A47J 42/46* (2013.01)

(58) Field of Classification Search
  CPC .. A47J 42/12; A47J 42/16; A47J 42/20; A47J 42/38
  See application file for complete search history.

(56) References Cited

U.S. PATENT DOCUMENTS

| 6,149,084 A * | 11/2000 | Karg ..................... A47J 42/50 241/257.1 |
| 2004/0200912 A1* | 10/2004 | Park ..................... A47J 42/18 241/100 |
| 2010/0037778 A1 | 2/2010 | Remo |
| 2012/0228418 A1* | 9/2012 | Mazzer ................ A47J 42/18 241/290 |
| 2013/0115342 A1* | 5/2013 | Van Os ................ A47J 31/404 426/231 |
| 2020/0221904 A1 | 7/2020 | Girardi |

FOREIGN PATENT DOCUMENTS

| CN | 201256890 Y | 6/2009 |
| EP | 1493368 B1 | 10/2005 |
| NZ | 533531 A | 11/2005 |

* cited by examiner

Primary Examiner — Matthew Katcoff
Assistant Examiner — Mohammed S. Alawadi
(74) Attorney, Agent, or Firm — Carmel Patent Agency; Robert J. Ballarini

(57) ABSTRACT

Grinder-doser device for coffee beans includes a body which internally houses an electric motor, having a shaft, which is integral in rotation with the lower grinder holder to which the lower grinder is joined, said lower grinder holder, and said lower grinder being housed inside a head which has a horizontal annular seat in the lateral edge, which houses an upper grinder. The upper grinder being formed by a toothed annular portion housed inside a hollow annular portion, which in turn is surrounded by an annular portion, which rests on the annular seat. The flat upper surface of the upper grinder is rectified and collimated with the plane passing through the ends of the teeth of the toothed portion.

3 Claims, 4 Drawing Sheets

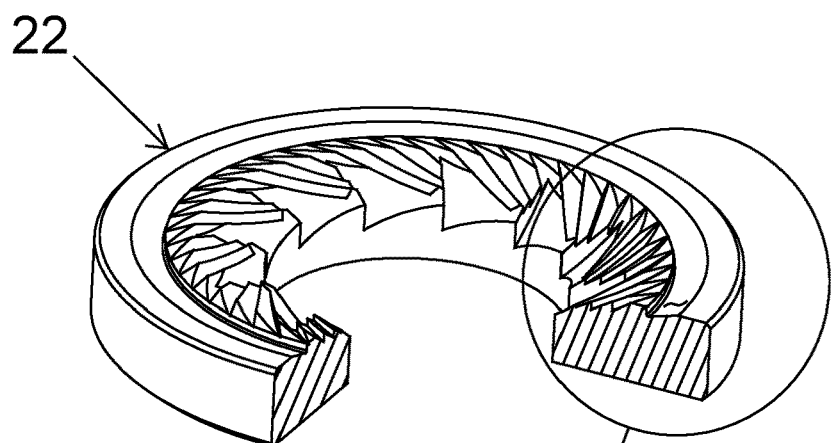
FIG.4
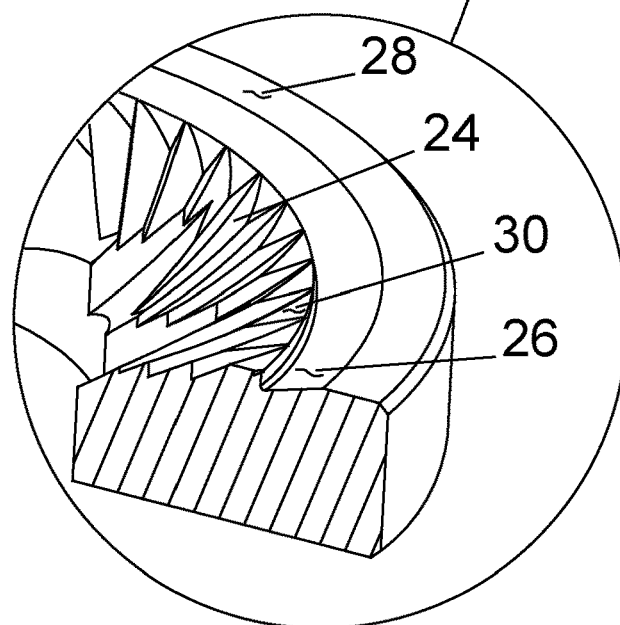
FIG.5
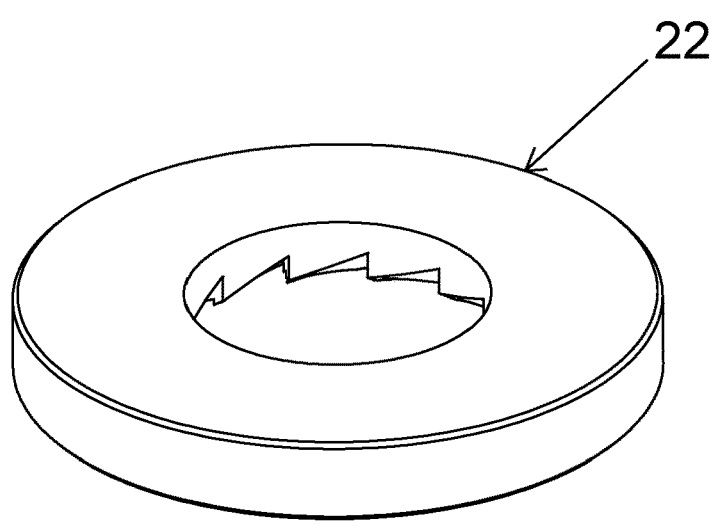

GRINDER/DOSER DEVICE FOR COFFEE BEANS

FIELD OF THE INVENTION

The present invention relates to a grinder-doser device for coffee beans.

BACKGROUND

Machines of a professional type are known for preparing espresso coffee, conventionally called coffee machines, which substantially comprise a boiler that generates hot water and steam by sending them to one or more dispensing groups to make them pass through a corresponding number of filter-holder cups containing the ground coffee, these cups being previously filled in the filter with the coffee powder obtained from the ground beans by a suitable machine, called a grinder-doser, which doses it with precision.

Generally, the coffee beans in the grinder-doser device come from a bell placed above the grinding head and are ground in such a way that the bean powder is collected and dispensed through a dispensing spout inside the cup.

These coffee grinder-dosers comprise a body housing two opposing grinders, one of which is driven by an electric motor, the other axially movable with respect to the first on activation of a threaded ring engaging in an upper grinder holder body.

A further version includes a body housing two opposing millstones, one of which fixed, housed in the upper grinder holder, the other operated by an electric motor and axially movable by means of a lever placed at the opposite end of the motor.

In particular, in these grinder-dosers, the upper grinder holder is fastened to the head by screws and the upper grinder holder is tied to the upper grinder by means of other screws. In these grinder-dosers, part of the parallelism between the grinders is guaranteed by the perfect execution of the pieces that compose them and the assembly of the components. Since it is necessary from time to time to clean the grinding chamber, this constraint system entails, both in the assembly phase and in the maintenance phase, a double possibility of error in the coupling phase which can give rise to an irregular particle size of the coffee powder which in turn gives rise to a inconsistent taste, irregularities in the ground dose and residues of powder in the cup.

SUMMARY

The purpose of the invention is to eliminate these drawbacks and to produce a coffee grinder-doser that allows to obtain a regular grain size.

Another purpose of the invention is to create a grinder-doser device that allows the easy removal and coupling of the upper grinder from and to the lower grinder.

This object is achieved according to the invention with a grinder-doser device as described in claim 1.

BRIEF DESCRIPTION OF THE DRAWINGS

The present invention is further clarified hereinafter in a preferred embodiment thereof reported for purely illustrative and non-limiting purposes with reference to the attached drawing tables in which:

FIG. 4 is a perspective view of the upper grinder; and

FIG. 5 shows it in the opposite view.

DETAILED DESCRIPTION OF THE PREFERRED EMBODIMENTS

Figure 1:
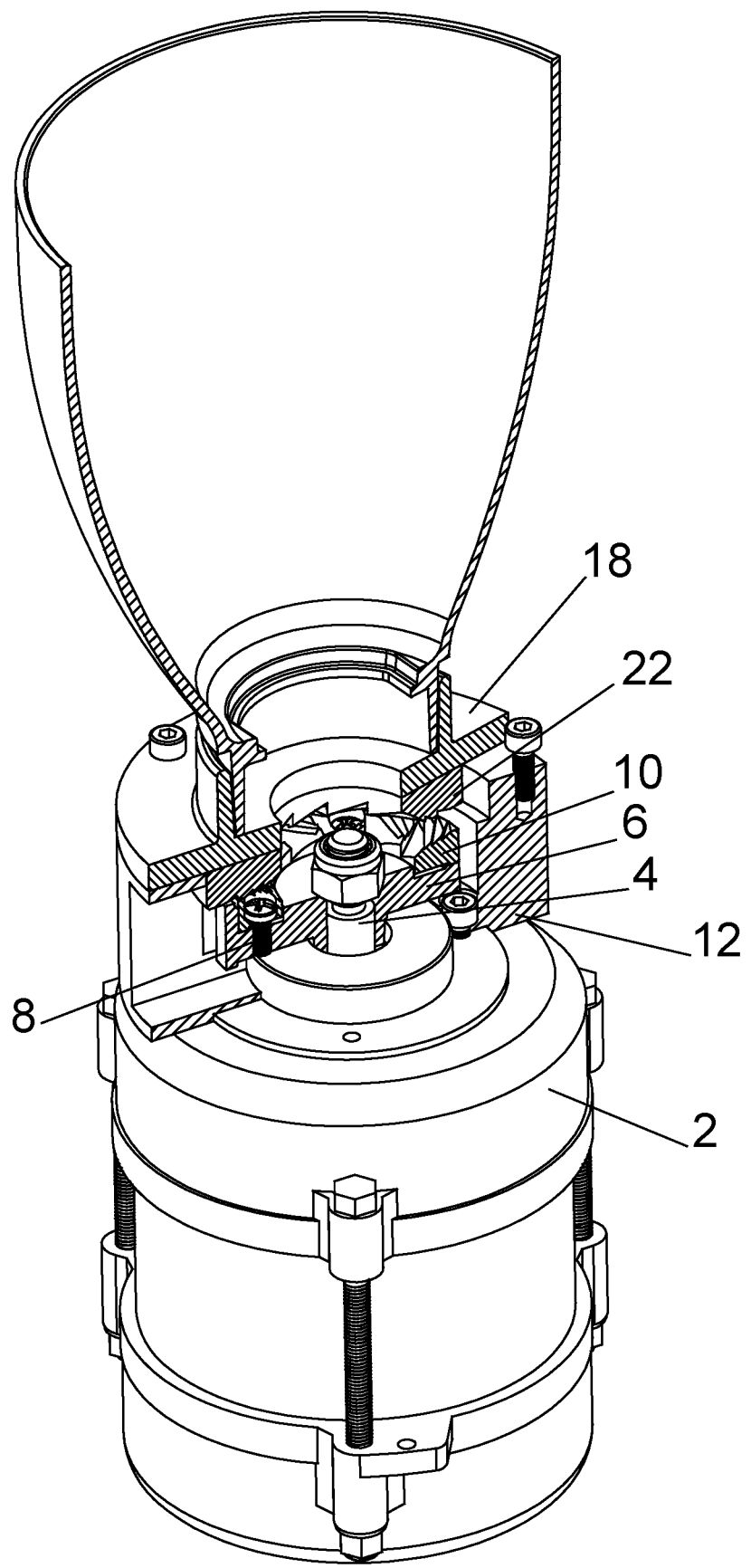
FIG. 1 shows a partially sectioned perspective view of a coffee grinder according to the invention.
Figure 2:
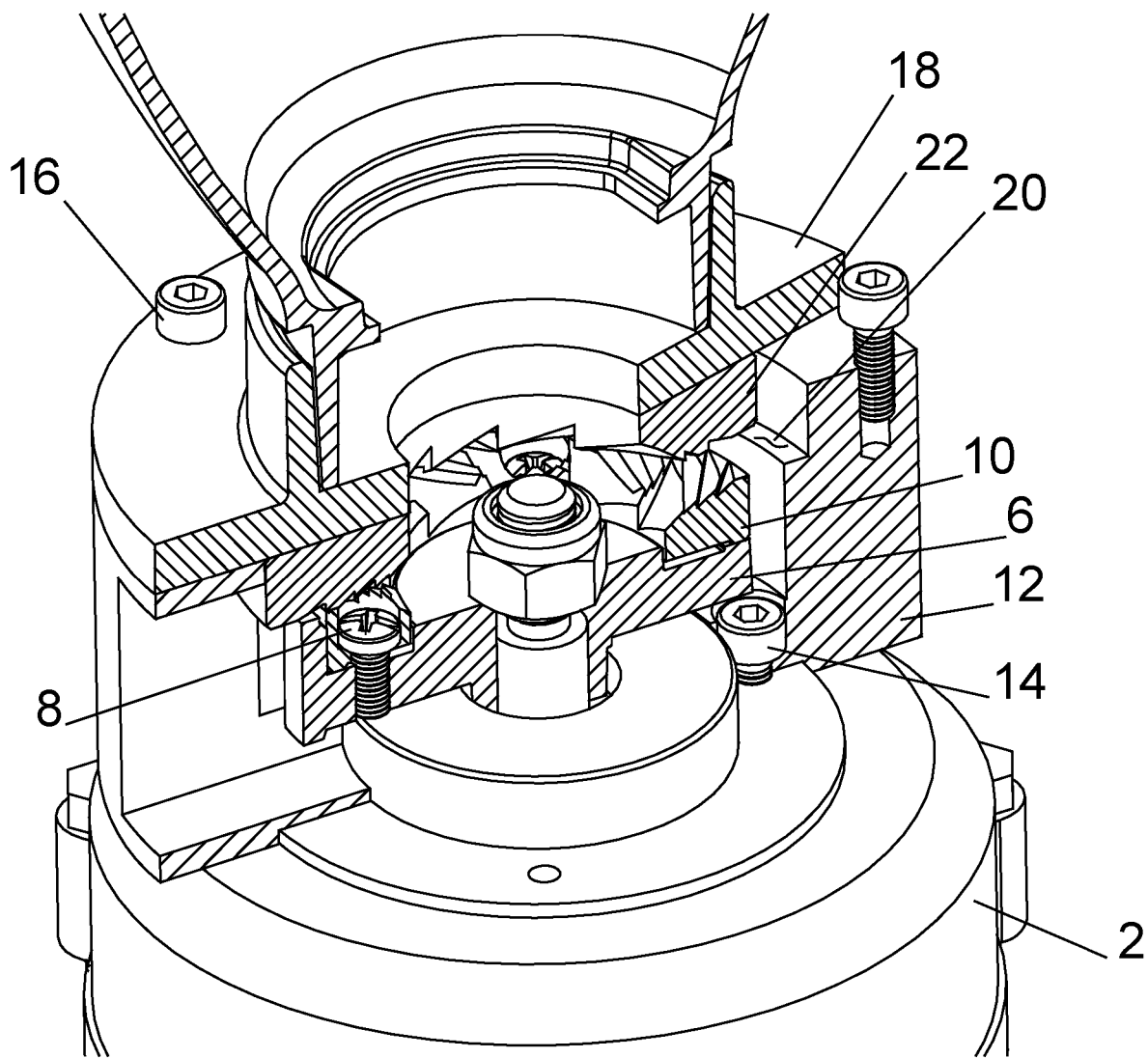
FIG. 2 shows the grinding chamber in perspective view from above.
Figure 3:
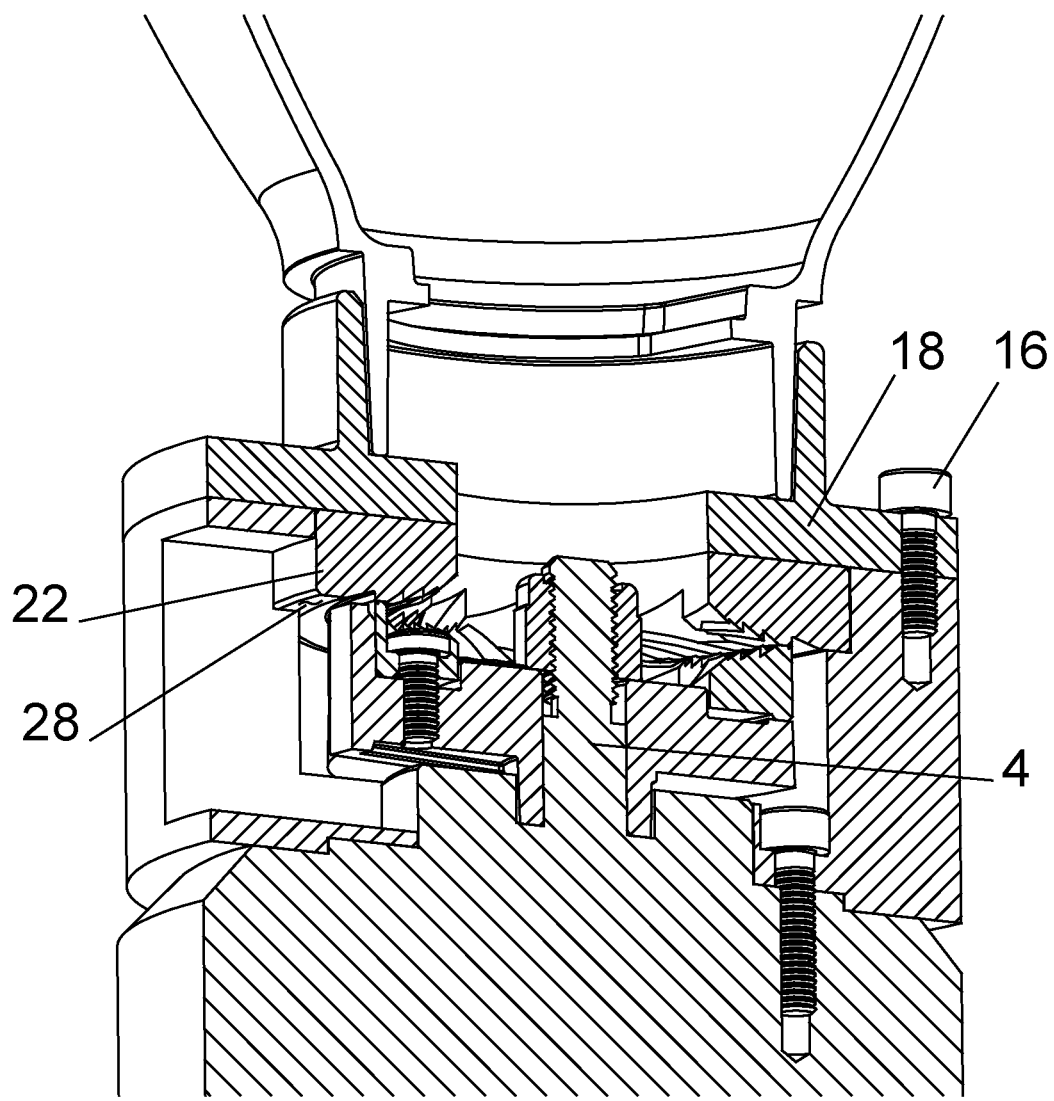
FIG. 3 is a bottom perspective view of the grinding chamber with the two millstones.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced items unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof.

As can be seen from the figures, the grinder-doser apparatus according to the invention comprises, inside a body not shown in the drawings, an electric motor 2 whose shaft 4 is integral with the lower grinder holder 6.

The lower grinder 10 is fastened to the lower grinder holder 6 by means of screws 8.

The lower grinder holder 6 and the lower grinder 10 have a lateral edge delimited by an annular head 12 fixed to the motor 2 by means of screws 14.

A bell holder flange 18 is also constrained to the head 12 by means of screws 16.

The head 12 is shaped in such a way as to form a horizontal annular seat 20 on which the upper grinder 22 rests.

More specifically, the upper grinder 22 is formed by a toothed annular portion 24 housed inside a hollow annular body 26 with a triangular section, in turn surrounded by an annular portion 28 which rests on the horizontal annular seat 20 and has its surface rectified flat top and collimated with the plane passing through the ends of the teeth 30 of the toothed annular portion 24.

In particular, the hollow annular body 26 has a section which is squared, rectangular, semi-circular, arched or any shape that interrupts the rectified and collimated surface between the end of the teeth 30 and the annular portion 28.

From what has been said it is clear that, thanks to the particular conformation of the head 12 and of the upper grinder 22, it is possible to carry out the constraint with a single parallel coupling point given by the surface 28 and the surface 20, coupling constrained by screws 16 which push the support flange bell 18 against the upper millstone 22.

It is understood, therefore, that this invention is not limited to the particular embodiments disclosed, but is intended to cover all modifications which are within the spirit and scope of the invention as defined by the appended claims; the above description; and/or shown in the attached drawings.

The invention claimed is:

1. Grinder-doser apparatus for coffee beans comprising a body which internally houses an electric motor (2) having a shaft (4) which is integral in rotation with a lower grinder holder (6) to which the lower grinder (10) is joined, said lower grinder holder (6), and said lower grinder (10) being housed inside a head (12) which has a horizontal annular seat (20) in a lateral edge, which houses an upper grinder (22), said upper grinder (22) being formed by a toothed annular portion (24) housed inside a hollow annular portion (26) in turn surrounded by an annular portion (28) which rests on the annular seat (20), wherein a flat surface of the annular portion (28) of the upper grinder (22) is rectified and collimated with a plane passing through ends of the teeth (30) of the toothed annular portion (24).

2. The apparatus according to claim 1, wherein the lower grinder holder (6) is fastened by means of screws (8) to the lower grinder (10).

3. The apparatus according to claim 1, wherein the hollow annular portion (26) has a triangular, square, rectangular, semicircular, arched section or a shape that interrupts the rectified surface collimated between the ends of the teeth (30) and the annular portion (28).

\* \* \* \* \*